(12) United States Patent
Meranda et al.

(10) Patent No.: US 11,107,045 B2
(45) Date of Patent: Aug. 31, 2021

(54) SMART METER BASED SERVICE TICKET CLOSING CONTROL

(71) Applicants: Adam D. Meranda, Jupiter, FL (US); Daniel J. Barbosa, Jupiter, FL (US); Lakshmi R. Penmetsa, Jupiter, FL (US)

(72) Inventors: Adam D. Meranda, Jupiter, FL (US); Daniel J. Barbosa, Jupiter, FL (US); Lakshmi R. Penmetsa, Jupiter, FL (US)

(73) Assignee: FLORIDA POWER & LIGHT COMPANY, Juno Beach, FL (US)

( * ) Notice: Subject to any disclaimer, the term of this patent is extended or adjusted under 35 U.S.C. 154(b) by 657 days.

(21) Appl. No.: 15/463,835

(22) Filed: Mar. 20, 2017

(65) Prior Publication Data

US 2018/0267494 A1    Sep. 20, 2018

(51) Int. Cl.
G06Q 10/00 (2012.01)
*G06Q 10/06* (2012.01)
*G06Q 50/06* (2012.01)

(52) U.S. Cl.
CPC ..... *G06Q 10/20* (2013.01); *G06Q 10/063114* (2013.01); *G06Q 50/06* (2013.01)

(58) Field of Classification Search
CPC . G06Q 10/20; G06Q 50/06; G06Q 10/063114
See application file for complete search history.

(56) References Cited

U.S. PATENT DOCUMENTS

| 7,089,125 | B2   | 8/2006  | Sonderegger |              |
|-----------|------|---------|-------------|--------------|
| 8,892,375 | B2   | 11/2014 | Taft        |              |
| 9,037,305 | B2*  | 5/2015  | McHann, Jr. | H02J 13/00034 |
|           |      |         |             | 700/286      |
| 9,041,544 | B2*  | 5/2015  | Bagasra     | G06F 1/30    |
|           |      |         |             | 709/224      |
| 9,091,734 | B2*  | 7/2015  | Hughes, Jr. | H04B 10/27   |
| 10,164,431 | B2* | 12/2018 | Karlak      | G06Q 10/0631 |
| 10,655,984 | B2* | 5/2020  | Schwartz    | H04L 45/22   |
| 2011/0305338 | A1* | 12/2011 | Rogan     | H04W 12/02   |
|           |      |         |             | 380/270      |
| 2012/0146799 | A1* | 6/2012 | Bell       | H04Q 9/00    |
|           |      |         |             | 340/635      |

(Continued)

OTHER PUBLICATIONS

"Smart Metering for Outage Management of Electric Power Distribution Networks", by Yan He, Nick Jenkins, and Jianzhong Wu, Applied Energy Symposium and Forum, REM2016: Renewable Energy Integration with Mini/Microgrid, p. 19-21, Apr. 2016 (Year: 2016).*

(Continued)

*Primary Examiner* — Pan G Choy
(74) *Attorney, Agent, or Firm* — Tarolli, Sundheim, Covell & Tummino LLP

(57) ABSTRACT

A service ticket control can close an open service ticket for a field service visit to resolve a power outage experienced at a given customer premises. The open service ticket can be closed in response to usage data from a given smart meter at the customer premises indicating that the customer premises is consuming power above a predetermined threshold level. The service ticket control closes the open service ticket prior to a service crew assigned the service ticket arriving at the given customer premises.

14 Claims, 3 Drawing Sheets

(56) References Cited

U.S. PATENT DOCUMENTS

| | | | |
|---|---|---|---|
| 2012/0200423 A1 | 8/2012 | DiLuciano et al. | |
| 2013/0066570 A1 | 3/2013 | Sfaelos | |
| 2013/0338945 A1* | 12/2013 | Feng | H02J 13/00012 702/58 |
| 2014/0277788 A1* | 9/2014 | Forbes, Jr. | H02J 13/00017 700/286 |
| 2015/0061859 A1* | 3/2015 | Matsuoka | G06Q 10/083 340/501 |
| 2015/0127601 A1* | 5/2015 | McGill | G06Q 50/06 707/603 |
| 2016/0364648 A1 | 12/2016 | Du et al. | |
| 2017/0109260 A1* | 4/2017 | Wang | G06F 11/3664 |
| 2018/0024205 A1* | 1/2018 | Kim | H02J 13/0017 700/293 |

OTHER PUBLICATIONS

"Smart Metering for Smart Electricity Consumption", by Praveen Vadda and Sreerama Murthy Seelam, School of Computing, Blekinge Institute of Technology, 37179 Karlskrona, Sweden. Master Thesis Electrical Engineering, May 2013. (Year: 2013).*

"Managing Power Outage and Reliability Issues with OpenWay", by Dave Stensland, Itron White Paper, 2008, Itron inc. (Year: 2008).*

"Smart Meters for Power Grid—Challenges, Issues, Advantages and Status", by Soma Shekara Sreenadh Reddy Depuru, Lingfeng Wang, Vijay Devabhaktuni and Nikhil Gudi. 2011 IEEE. (Year: 2011).*

* cited by examiner

SMART METER BASED SERVICE TICKET CLOSING CONTROL

TECHNICAL FIELD

The present disclosure relates to systems and methods for closing an open service ticket.

BACKGROUND

Electrical power distribution grids can be implemented as radial, loop or network type systems. The distribution grids are arranged and interconnected to a substation in different ways depending on the type of system configuration. However for each type of distribution system configuration, the distribution circuits (commonly referred to as feeders and lateral feeders) distribute power delivered from the substation to loads at premises coupled to the grid through smart meters.

A smart meter is an electronic device that records consumption of electric energy in intervals of an hour or less and communicates that information at least daily back to a utility provider for monitoring and billing. Smart meters enable two-way communication between the meter and the utility provider. Unlike home energy monitors, smart meters can gather data for remote reporting. Such an advanced metering infrastructure (AMI) differs from traditional automatic meter reading (AMR) in that AMI enables two-way communications with the meter.

Various types of faults can occur in an electrical distribution system, some of which result in power outages (the loss of electric power service to customers). For example, a short circuit fault causes a protective element upstream of the fault to open isolating the short circuit fault from the grid. As one example, a short circuit may be caused by a tree branch contacting power lines during a storm. Customers downstream of the opened protective element become de-energized resulting in an outage. Another type of fault is an open conductor element fault that similarly causes the downstream customers to experience a power outage. An open conductor element may be caused by a power line snapping during a storm, or a coupling joining two power lines becoming deficient and then failing thereby resulting in the open conductor.

SUMMARY

One example relates to a non-transitory machine readable medium having machine executable instructions. The machine executable instructions can include a service ticket control that closes an open service ticket for a field service visit to resolve a power outage experienced at a given customer premises in response to usage data from a given smart meter at the customer premises indicating that the customer premises is consuming power above a predetermined threshold level. The service ticket control closes the open service ticket prior to a service crew assigned to the service ticket arriving at the given customer premises.

Another example relates to a system that can include a memory for storing machine executable instructions and a processing unit comprising one or more processor cores that access the memory and executes the machine readable instructions. The machine readable instructions can include a customer service system that receives an indication that a given customer premises of a plurality of customer premises is experiencing a power outage. The machine readable instructions can also include a service ticket control that opens a service ticket for the power outage in response to a notification of the power outage from the customer service system. The service ticket requests a field service visit to the given customer premises to resolve the power outage. The machine readable instructions can further include a service crew dispatch that schedules a field service visit for the given customer premises in response to the opening of the service ticket. The service ticket control closes the opened service ticket for a field visit to resolve a power outage experienced at a given customer premises in response to usage data from a given smart meter at the customer premises indicating that the customer premises is consuming power above a predetermined threshold level prior to the service crew assigned the service ticket arriving at the given customer premises.

Yet another example relates to a method. The method can include receiving a notification that a given customer premises is experiencing a power outage. The method can also include generating a service ticket for a field service visit to the customer premises in response to the notification. The method can further include pinging, after the generating, a smart meter at the customer premises for usage data. The method can yet further include receiving, from the smart meter, the usage data. The usage data can indicate that the customer premises is consuming power at a level above a threshold level. The method can still further include canceling the field service visit to the customer premises in response to the receiving.

DETAILED DESCRIPTION

Figure 1:
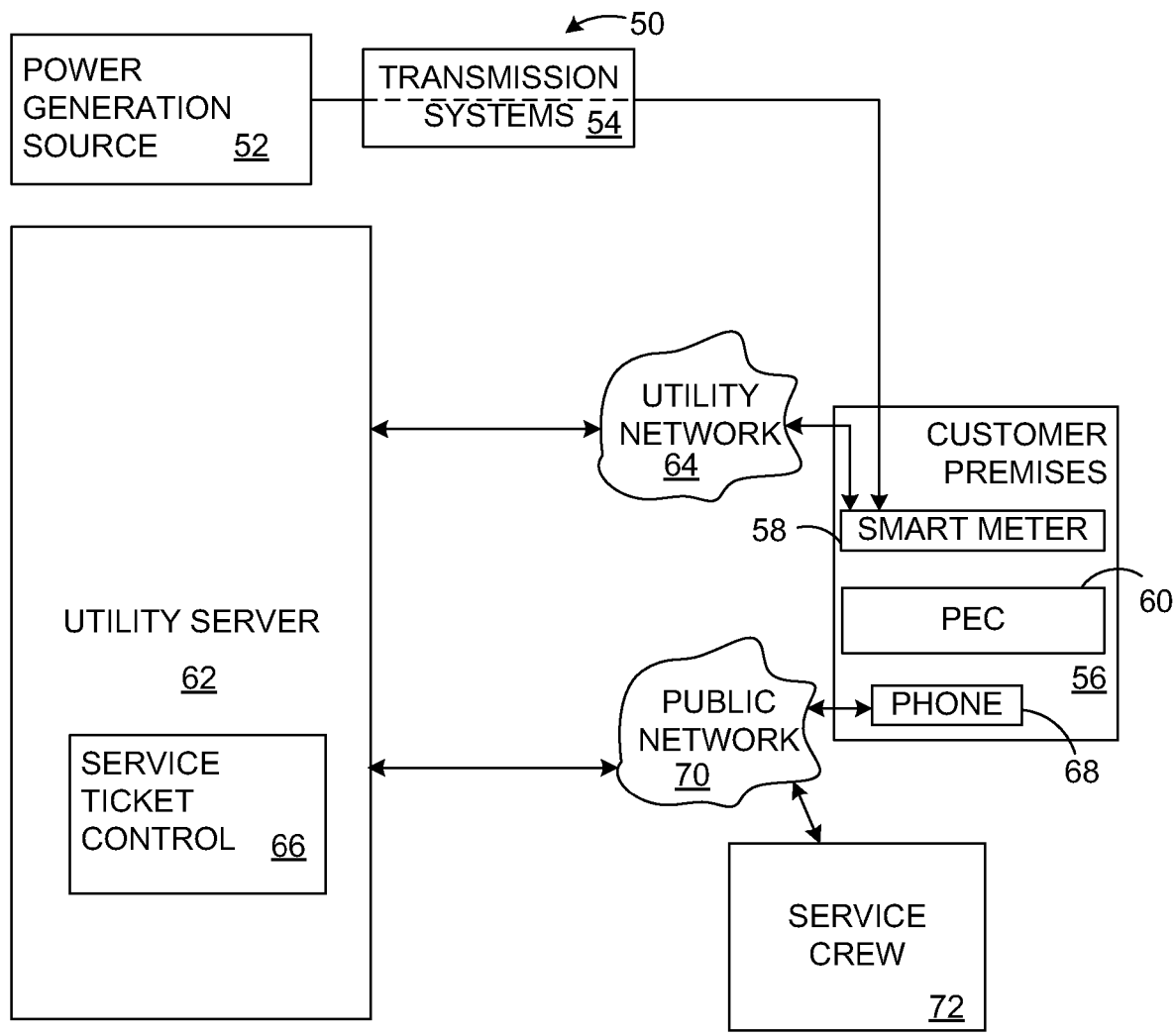
FIG. 1 illustrates an example of an electric power distribution system that can control the dispatch of service crews.

This disclosure relates to an electric power distribution system and a method for controlling the dispatch and recall of service crews that repair faults (e.g., power outage and/or loss of service) reported at a (single) customer premises, such as a single no current (SNC) event. The system matches a fault reported by a given customer with pings (e.g., requests for status checks) to the given customer's smart meter to determine if the fault has been corrected prior to arrival of a service crew at the given customer's premises. Upon detecting that the fault is corrected prior to arrival of the service crew, the service crew is recalled (or prevented from being dispatched) to avoid an unnecessary field visit to the given customer's premises.

In particular, upon experiencing a fault (e.g., power outage and/or loss of service), the given customer may contact the system via telephone call, text message and/or email to report the fault. In such a situation, the system can generate a service ticket (e.g., a work order) to dispatch a service crew to correct the fault and the system can associate pings for status checks of a given smart meter installed at the customer premises with the work ticket. Additionally, the system can increase a rate of pinging of the given smart meter for a status check from an initial rate (e.g., once per hour) to an outage rate (e.g., once per 15 minutes). The ping can include a query to determine a current incoming voltage level of the given smart meter, a voltage history of the given smart meter and a current power consumption by the given customer.

In some situations, the fault may be corrected prior to the arrival of the service crew at the customer premises. For instance, during a telephone call where the given customer reports the fault, the given customer may be instructed to reset a circuit breaker or replace a blown fuse. Accordingly, resetting the circuit breaker or replacing the blown fuse may correct the fault (restore power) at the given customer premises. Similarly, the fault may be caused by a temporary excessive load (e.g., a "brown out") that may be automatically corrected within a few minutes. In either situation, a smart meter ping occurring after report of the fault and after correction of the fault could indicate that the given customer currently has an acceptable incoming voltage and that the given customer is currently consuming power (e.g., drawing current), thereby indicating that the fault has been corrected. In some examples, after correcting the fault, the customer may not report the correction to the utility provider. Accordingly, based on the results of the ping, the system can recall (or prevent a dispatch of) the service crew, prior to the service crew arriving at the given customer's premises, thereby avoiding a needless customer interruption by the arrival of the service crew, and reducing the time spent by the service crew on the service call.

By employing these systems and methods, unnecessary field visits to customer premises can be reduced. In particular, the vast majority of the time (e.g., 95% or more) that a customer's smart meter reports that the customer has both (i) an acceptable incoming voltage at the smart meter and (ii) is consuming power (e.g., drawing current), a field visit to the customer's premises is unnecessary. Additionally, conventional attempts to prevent unnecessary dispatching of a service crew to customer premises include matching a customer fault report to an area wide power outage, thereby making a "guess" that the fault is due to the area wide power outage. However, in these conventional systems, there is no physical confirmation that the fault has been corrected. In contrast, the system of the present disclosure pings the smart meters for usage data to confirm that the fault has been corrected prior to recalling (or preventing dispatch of) the service crew.

FIG. 1 illustrates an example of an electric power distribution system 50 that can control the dispatch of service crews to correct faults. The electric power distribution system 50 can include a power generation source 52 that can generate electric power. The power generation source 52 could include, for example, a power plant, such as a coal-fired plant, a wind farm, a solar array, a nuclear plant, a fossil fuel plant or a combination thereof. The electric power distribution system 50 can provide power service to a plurality of customer premises via transmission systems 54. The transmission systems 54 can be representative of electrical components in a power grid downstream of the power generation source 52. For example, the transmission systems 54 can include, but are not limited to sub-stations, transmission lines and/or transformers, that step-down and/or condition an electrical signal generated by the power generation source 52 for consumption.

For purposes of simplification of explanation, only one customer premises 56 of the plurality of customer premises is illustrated, but it is to be understood that there could be hundreds, thousands or millions of instances of the customer premises 56 served by a utility provider. The customer premises 56 could be representative of a domicile (e.g., a house or apartment), an office building, and industrial complex, or nearly any facility that is configured to receive power service from the power generation source 52.

The incoming power line for the customer premises 56 can be coupled to a smart meter 58. The smart meter 58 can be coupled to a protective electrical component 60 coupled downstream from the smart meter 58. The protective electrical component 60 can be, for example, a circuit breaker or a fuse box designed to protect downstream components from excess current.

The smart meter 58 can communicate with a utility server 62 via a utility network 64. The utility network 64 could be implemented as a mesh network, such as an advanced metering infrastructure (AMI) network. The utility server 62 can be representative of a plurality of servers (e.g., a server farm) executing application software implemented to facilitate operations of a utility provider (e.g., a power company). The plurality of servers represented by the utility server 62 could be local computer devices (e.g., server blades) operating at a single premises and/or distributed across multiple facilities, such as in a computing cloud.

The utility server 62 can include a service ticket control 66. The service ticket control 66 can generate and process service tickets for service crews (repair/maintenance crews). A service ticket can provide information needed resolve an issue (e.g., a fault), such as a power outage. For example, a service ticket can include a location (e.g., an address) of an issue, information characterizing the type of issue at the location, contact information for the issue, etc. The utility server 62 can open and close service tickets, provide service tickets to other systems, such as a service crew dispatch, etc.

As used herein, the term "service crew" denotes machinery, tools and/or human resources needed to resolve issues throughout the electric power distribution system 50. Each service crew can include a vehicle, and a transceiver (e.g., a mobile computing device or a radio) for two-way communication with the utility server 62.

The utility server 62 can include software and hardware for interfacing with the smart meter 58 via the utility network 64. Accordingly, the utility server 62 can ping (e.g., a status check request) the smart meter 58 for usage data at an initial (normal operations) rate. The initial rate can be about once per hour (or less frequent). In response, the smart meter 58 can provide the usage data to the utility server 62. The usage data can indicate an input (incoming) voltage observed by the smart meter 58, an incoming voltage history (e.g., over a previous 48 hour period or other time period) and a current amount of power (e.g., in kilowatt hours (kWh)) being consumed by the customer premises 56.

Due to a plurality of reasons, as described herein, a customer at the customer premises 56 may experience a power outage (a service interruption). In such a situation, the customer may employ a phone 68 to contact the utility server 62 and report the power outage. The phone 68 can be implemented as a smart phone, a plain old telephone service (POTS) phone, a feature phone, etc. The phone 68 can connect to the utility server 62 through a public network 70, such as the Internet or the Public Switch Telephone Service (PSTN). It is noted that the public network 70 and the utility network 64 can operate as separate networks. That is, although in some examples, the public network 70 and the utility network 64 may share components, a failure on one of the networks does not inherently induce a failure on the other network.

Upon connecting with the utility server 62 (e.g., via a customer support system), the customer can report the power outage being experienced. The service ticket control

66 can receive a notification of the power outage and request that a ping rate of the smart meter 58 be increased.

In response, the utility server 62 can increase the ping rate from the initial rate to an outage rate (e.g., once per fifteen minutes or more often). Additionally, the utility server 62 can generate an immediate (e.g., within about 5 minutes) ping of the smart meter 58. The response (e.g., usage data) or the lack thereof (e.g., a timeout) can be provided back to the service ticket control 66.

The service ticket control 66 can analyze the results of the ping to determine a course of action. In a first instance, if there is no response to the ping (e.g., a timeout), the service ticket control 66 can open (generate) a service ticket for a field service visit to the customer premises 56. Additionally, if usage data is returned indicating that the smart meter 58 has an incoming voltage that meets an acceptable threshold (e.g., about 120 or 220 Volts (V)) and that the customer premises is consuming power at a level below an acceptable threshold (e.g., near 0 kWh), in some examples, the service ticket control 66 may (or may not) also open the service ticket. Additionally or alternatively, in this situation, the service ticket control 66 may provide a notification to the utility server 62 (at the customer service system) that the customer premises has acceptable incoming voltage but is not consuming power, thereby indicating that the protective electrical component 60 has been tripped (e.g., as in a circuit breaker) or blown (e.g., as in a fuse).

The utility server 62 (at the customer service system) can provide information for correcting a fault behind (downstream) the smart meter 58 in response to detecting that the acceptable incoming voltage but is not consuming power. In particular, the customer can be provided with information (verbal or text) indicating how the protective electrical component 60 can be reset (as in a circuit breaker) or replaced (as in a fuse). Still further, the information can characterize instructions for checking a power transfer switch, such as in the case where the customer premises 56 has an alternative power generation source (e.g., a solar panel and/or a backup battery). In some examples, the customer may request a service call to assist with the resetting or replacing. In this situation, the service ticket control 66 may also open the service ticket for a field service visit to the customer premises 56.

Upon opening the service ticket for the customer premises 56, the utility server 62 can issue the service ticket to a service crew 72. In some examples, the utility server 62 can communicate with the service crew 72 via the public network 70. Moreover, in some examples, the service crew 72 may set out (e.g., drive to) for the customer premises 56 immediately. In other examples, the service crew 72 may add the service ticket to a queue.

Between the time that the service ticket control 66 is opened and a time that the service crew 72 arrives at the customer premises 56, power may be restored to the customer premises 56. For example, someone besides the customer (e.g., a family member or neighbor) may reset or replace the protective electrical component 60. In these situations, upon resetting or replacing the protective electrical component 60 or the power simply being restored by some other method, the customer premises 56 can consume power (e.g., draw current) again, which consumption is recorded at the smart meter 58. Thus, upon receipt of the next ping from the utility server 62 (occurring at the outage rate), the smart meter 58 can provide usage data that indicates that the incoming voltage is at an acceptable level, the incoming voltage history and that consumption of power at the customer premises 56 is above the acceptable threshold level (e.g., above about 0 kWh). Upon receipt of such usage data, the utility server 62 can forward the usage data to the service ticket control 66.

In response, the service ticket control 66 can determine that the power outage reported for the customer premises 56 has been resolved, and the ticket open for the field service visit by the service crew 72 can be closed. Moreover, the service ticket control 66 can provide a notification of the closing of the service ticket to the utility server 62. In response, the field service visit to the customer premises can be canceled. Accordingly, the service crew 72 can be recalled from dispatch and/or the service ticket may be removed from the queue of the service crew 72. In this manner, the service crew is not unnecessarily deployed to the customer premises 56. Accordingly, the service crew 72 can be redeployed to other customer premises that need attention. Additionally, since the usage data from the smart meter 58 verifies that the customer premises 56 is consuming power (e.g., current is flowing across the protective electrical component 60), there is a high probability (e.g., 95% or more) that no additional assistance is needed at the customer premises 56. Furthermore, by closing the service ticket prior to arrival of the service crew 72, unnecessary expenses, such as those charged for correcting issues behind (downstream) the smart meter 58 can be avoided.

Figure 2:
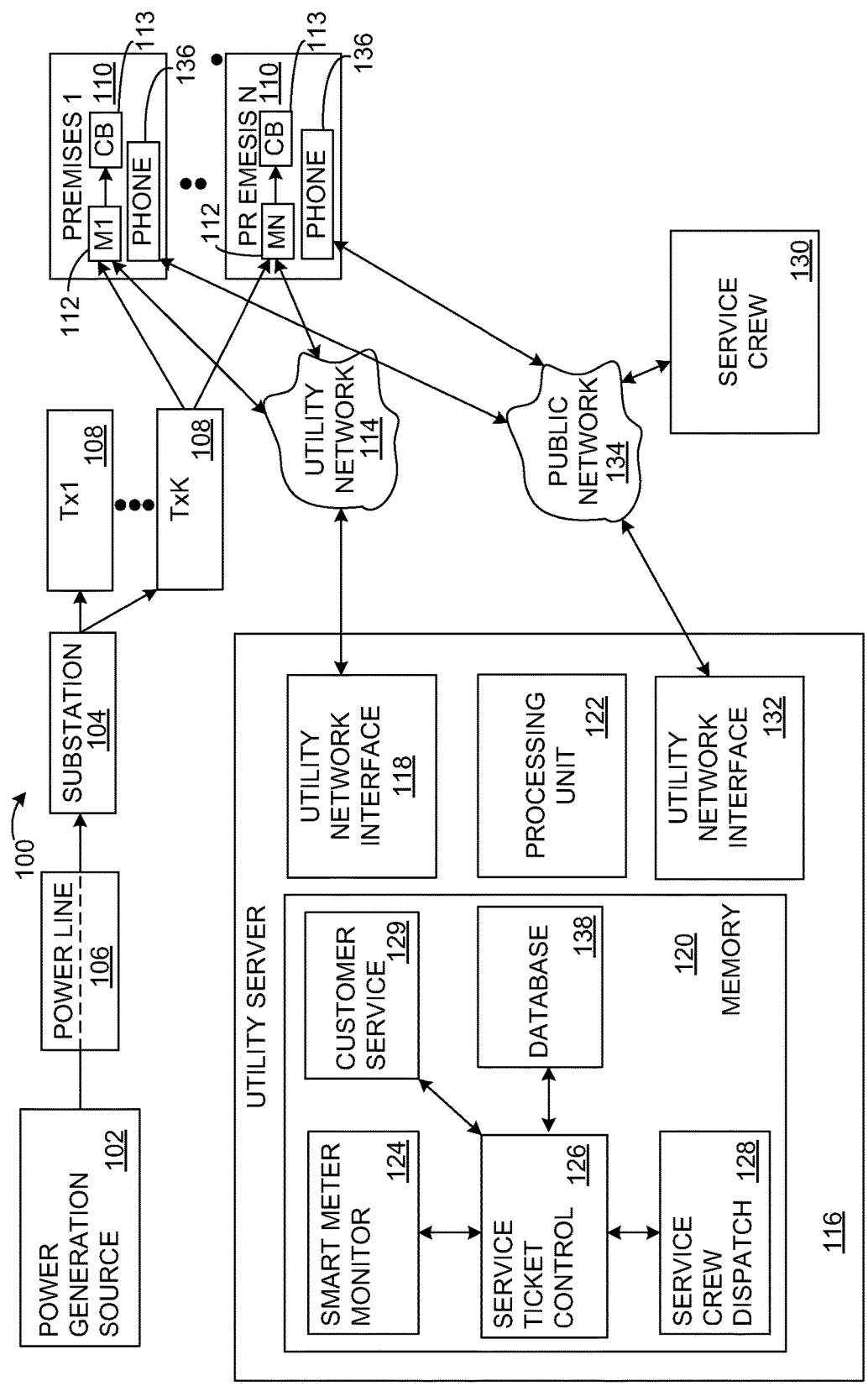
FIG. 2 illustrates another example of an electric power distribution system that can control the dispatch of service crews.

FIG. 2 illustrates another example of electric power distribution system 100 that can control the dispatch of service crews. The electric power distribution system 100 can include a power generation source 102 that can generate electric power. The power generation source 102 could be representative of a power plant, such as a fossil fuel or coal-fired plant, a nuclear plant, a wind farm and/or a solar array and attendant constituent structures or any combination thereof. The power source 102 can transmit a high-voltage, alternating current (AC) power signal (such as a 115 or 220 kilovolt (kV) AC power signal) to a substation 104 via a power line 106 (e.g., a transmission line).

The substation 104 can transform the high voltage AC power signal into a mid-voltage power signal. For example, it may be desirable in some circumstance to step down (or to step up) voltage via one or more substation 104 electrical components, to phase-shift and/or otherwise to adjust current phase or amplitude, for instance, to achieve a desired power function as specified by the kind of load and/or to minimize energy lost in the electric power distribution system 100. As one example, the substation 104 may include electrical components (transformers) for transforming and conditioning a 115 kV AC signal into 41.6 and/or 12.47 kV AC signal. In another example, the substation 104 may include electrical components for transforming and conditioning a 220 kV AC signal into a 66 kV AC signal. It is to be appreciated that in yet other examples, different input and output voltages could be implemented. It is noted that the electric power distribution system 100 may include more than one power generation source 102 and/or more than one substation 104. The substation 104 can distribute electric power signals to K number of transformers 108 (labeled as $Tx_1 \ldots Tx_K$), where K is an integer greater than one.

Each of the K number of transformers 108 can transform the mid-voltage power signal into a low-voltage consumer power signal, such as a 110-220 V AC power signal that are transmitted a corresponding N number of premises 110 (e.g., domiciles, office buildings or industrial complexes), where N is an integer greater than one. Each of the N number of premises 110 can have a smart meter labeled in FIG. 2 as M1 ... MN installed therein. The premises 110 can also be referred to as customer premises. For purposes of simplification of explanation, only one transformer 108 (Tx$_k$) is illustrated as being connected to the N number of premises 110, but it is to be understood that each transformer 108 is connected to a set of the N number of premises 110.

Each of the smart meters 112 can be configured to measure electric power consumed at each corresponding premises 110 and generate network messages related to meter electric power usage ("usage data") at a particular premises 110. In some examples, the smart meter 112 at each of the N number premises 110 may be configured to be operated in accordance with the Advanced Metering Infrastructure (or "AMI") specifications or protocols. Accordingly, the smart meters 112 may be referred to as "AMI meters". In other examples, the smart meters 112 can be configured to operate in accordance with a different protocol. In operation, the smart meters 112 can monitor, sense, record to track electrical consumption (or "usage") digitally and at predetermined and/or dynamically adjustable intervals.

Additionally, the N number of smart meters 112 can transmit usage data (e.g., via a secure radio frequency band) to other devices installed on or otherwise communicably coupled to the electrical grid or to a communications network (such as a utility network 114), where the smart meters 112 exchange data. In such a situation, the term "usage data" can refer to raw data (e.g., unmodified or unprocessed data as they are collected and that represent the amount of electrical energy consumed at the location metered by the smart meters 112) and/or to data and other information related to or derived from the raw data (e.g., readings and/or data points that may be time-stamped or otherwise processed to provide information in addition to an aggregate or a measure of cumulative consumption). In some examples, an aggregate usage value may be transmitted from a given smart meter 112, and in other examples, detailed, time-dependent usage rates may be transmitted from the given smart meter 112. The specific type and amount of data collected and processed at, and transmitted from the smart meter 112 can be application-specific and may vary in accordance with processing or computational capabilities of hardware components deployed in, as well as software functionalities implemented at or in cooperation with the smart meters 112.

The N number of smart meters 112 can be communicably coupled to the utility network 114 such that (network) messages including usage data collected (and possibly processed) by the smart meters 112 may be transmitted to the utility network 114. The utility network 114 can be, for example, a mesh network or a point-to-point network. In some examples, the utility network 114 can be an AMI network. In some examples, the utility network 114 can be implemented as a packet-switched network, such as an Internet Protocol (IP) network, including an IP version 6 (IPv6) network. Additionally, in some examples, the utility network 114 could be coupled to the Internet.

In some examples, each smart meter 112 (or some subset thereof) can include a battery-backup. In this manner, each smart meter 112 can send and receive messages on the utility network 114 even in situations where a power outage is present at the associated premises 110. Additionally, each of the N number of smart meters 112 can be coupled to a circuit breaker 113 at the associated premises 112. The smart meters 112 can be connected upstream of the circuit breakers 113. In this manner, the smart meter 112 can function properly in situations where the circuit breaker 113 has been tripped.

A utility server 116 (e.g., a computer system) can also be connected to the utility network 114 via a utility network interface 118 (e.g., a network interface card). The utility server 116 can be implemented by a utility provider (e.g., a power provider), such as a utility provider that controls the power generation source 102. The utility server 116 can include memory 120 to store machine executable instructions. The memory 120 can be implemented as a non-transitory machine readable medium. The memory 120 could be volatile memory (e.g., random access memory), non-volatile memory (e.g., a hard drive, a solid state drive, flash memory, etc.) or a combination thereof. The utility server 116 can include a processing unit 122 (e.g., one or more processor cores) that accesses the memory 120 and executes the machine readable instructions.

In some examples, the utility server 116 can be (physically) implemented at facilitates controlled by the utility provider. In such a situation, the utility server 116 could be representative of multiple servers (e.g., a server farm). Additionally or alternatively, the utility server 116 (or a portion thereof) can be implemented in a remote computing system, such as a computing cloud. In such a situation, features of the utility server 116, such as the processing unit 122, the network interface 118, and the memory 120 could be representative of a single instance of hardware or multiple instances of hardware with applications executing across the multiple of instances (i.e., distributed) of hardware (e.g., computers, routers, memory, processors, or a combination thereof). Alternatively, the utility server 116 could be implemented on a single dedicated computing device.

The utility network 114 can, in some examples, be implemented on (e.g., connected to) a public network, such as the Internet, a private network (e.g., a proprietary network) or a combination thereof (e.g., a virtual private network). In this manner, the utility server 116 can establish bi-directional communication with each of the N number of smart meters 112 (or some subset thereof) via the utility network 114.

The memory 120 can store application software for controlling operations of the utility provider. For example, the memory 120 can store application software for processing and billing systems, various monitoring, customer service, troubleshooting, maintenance, load balancing, accounting, and other types of activities that may be used to operate a utility provider.

As one example, the memory 120 can include a smart meter monitor 124. The smart meter monitor 124 can periodically ping each of the N number of smart meters 112 for usage data at an initial rate. The usage data received from each of the N number of smart meters 112 can include, for example, time-stamped information characterizing an incoming voltage level corresponding to a voltage provided by a transformer 108, an incoming voltage history over a predetermined period of time (e.g., 24-96 hours) and a current power consumed (e.g., kilowatt hours) and/or a current (e.g., amperes) consumed at an associated premises. Additionally, it is to be understood that the usage data can be configured based on the needs of the particular electrical power distribution system being implemented. That is, additional (or less) data points can be provided in each instance of usage data provided by the smart meters 112.

The memory 120 can also include a service ticket control 126. The service ticket control 126 can be configured to generate and process service tickets (e.g., work orders). The service ticket control 126 can provide a generated service ticket to a service crew dispatch 128. Additionally, the service ticket control 126 can update service tickets based on a status of the system. For example, the service ticket control 126 can revoke a service ticket provided to the service crew dispatch 128 (or another service crew), mark a service ticket as completed, etc.

Each service ticket generated by the service ticket control 126 can include information characterizing a location (e.g., an address) that service is needed and a type of service (e.g., restore power) that is needed. The service crew dispatch 128 can control the dispatch of service crews, such a service crew 130 to various locations in the electric power distribution system 100 to address the issue characterized in a particular (or multiple) service tickets.

As noted, the term "service crew" denotes machinery, tools and/or human resources needed to resolve issues throughout the electric power distribution system 100. Thus, the service crew 130 can include a vehicle, and a transceiver (e.g., a mobile computing device or a radio) for two-way communication with the utility server 62. In some examples, the service crew 130 can include a client application executing on the mobile computing device (e.g., a smartphone or a tablet computer) that can communicate with the service crew dispatch 128. In such a situation, the utility server 116 can include a public network interface 132 (another network interface card) that can communicate with the client application via a public network 134. In other examples, the service crew dispatch 128 can be controlled by a user and the user can communicate with an individual (e.g., a service person) in the service crew (e.g., via voice communication, such as telephone or radio). The public network 134 can include, for the example, the Internet, the public switched telephone network (PSTN), a carrier network, etc.

Upon completion of a service ticket, the service crew 130 can provide data to the service crew dispatch 128 via the public network 134 to indicate that the task identified in the service ticket is complete. In such a situation, the service crew dispatch 128 can employ the client application to communicate with the service ticket control 126 to update a status of the service ticket. Upon providing such information, the service crew dispatch 128 can communicate with the service ticket control 126 to mark the service ticket as complete (or otherwise close the service ticket).

The memory 120 can also include a customer service system 129. The customer service system 129 can be representative of application software and/or a contact center to initiate a service request, such as in response to a power outage (an interruption in service).

To facilitate understanding of the present disclosure, an extended given example (hereinafter, "the given example") is described. In the given example, a particular customer such as a customer located at Nth premises 110, experiences a power outage. In the given example, it is presumed that the smart meter 112 of the Nth premises 110 is connected to the Kth transformer 108.

An outage may result from an electric power distribution grid having any of a plurality of elements experiencing a fault (e.g., becoming deficient or failing). The elements include any component of the grid coupling the power generation source 102 to the N number of premises 112, including power generation source 102, the power line 106, the substation 104 and/or the associated transformer 108. If an element between or including power generation source 102 and the transformer 140 has a fault, then a multiple premises outage could result.

In the given example, a single premises outage, which can be referred to as a single no current (SNC) event can occur in a situation where an element between the Kth transformer 108 and the Nth premises 112 experiences a fault. A single premises outage can occur, for example, from a fault in a power line or coupling (e.g., due to corrosion or breakage) of the Kth transformer 108 to the Nth premises. In the given example, it can be presumed that the Kth transformer 142 has a power coupling for providing power to premises 1 through N. Moreover, in some examples, the smart meter 112 at the Nth premises 112 may experience a fault. Still further, if the circuit breaker 113 at the Nth premises 112 trips (e.g., due to excessive current draw), a single premises outage can also occur. It is to be understood that many other situations could cause a single premises outage or a multiple premises outage. In the given example, it is presumed that the power outage reported for the Nth premises 110 is caused by the circuit breaker 113 associated with the Nth premises 110 tripping.

In response to an outage, the customer can contact the utility provider. In some examples, the customer can employ a phone 136 to contact the customer service system 129 via the public network 134. The phone 136 could be, for example, a smart phone, a feature wireless phone, a POTS (plain old telephone service) phone, etc. In some examples, the customer can employ the phone 136 to establish voice communication (e.g., through the PSTN) with an automated system operating on the customer service system 129. In other examples, the customer can employ the phone 136 to establish voice communication with a representative of the utility company (e.g., in a contact center). In this situation, the representative can provide user input to the customer service system 129. In another example, the customer can employ the phone 136 to generate a text message (e.g., a short message service (SMS) message) directed to a telephone number associated with the customer service system 129. In yet another example, the customer can employ the phone 136 to generate an email for an email address associated with the customer service system 129.

The public network 134 can be employed for customer communications with the utility provider and the utility network 114 can be employed for smart meter message communication with the smart meter monitor 124 of the utility server 116. It is noted that the public network 134 operates separate from the utility network 114 used for bi-directional communication between the smart meter monitor 124 and the smart meters 112. In this manner, a failure at the utility network 114 does not (by itself) cause a failure in the public network 134 and vice versa even though various components (e.g., the Internet) may be shared between networks. Additionally, although in the given example, the customer at the Nth premises 110 is described as contacting the service ticket control 126 with the phone 136, other devices such as a personal computers or a tablet computer could be employed by the customer to report the outage to the customer service system 129.

In response to receipt of a notification of an outage, the customer service system 129 can send an outage notification to the service ticket control 126. Continuing with the given example, the notification of the outage can include, for example, information identifying an address of the Nth address.

The service ticket control 126 can access a database 138 to retrieve a record associated with the premises 110 that reports an outage. In the given example, the record can include, for example, a unique identifier of the Nth smart meter 112 at the Nth premises 110. The unique identifier could be, for example, an IPv6 address assigned to the Nth smart meter 112 and/or a media access control (MAC) address assigned to the Nth smart meter 112, etc.

Continuing with the given example, upon identifying the Nth smart meter 112, the service ticket control 126 can provide a notification to the smart meter monitor 124 to increase a ping rate for the Nth smart meter 112 (from the initial rate) to an outage rate. In some examples, the initial (normal) rate can be about once per hour and the outage rate can be once per fifteen minutes (or more or less frequently).

In the given example, in response to the request for an increase in ping rate, the smart meter monitor 124 can ping the Nth smart meter 112 immediately (e.g., within about 5 minutes) and increase the ping rate of the Nth smart meter 112 to the outage rate. If the Nth smart meter 112 is functioning properly, in response to the ping, the Nth smart meter 112 (via the utility network 114) can provide usage data. Alternatively, if the Nth smart meter is experiencing a fault (offline), the ping for the Nth smart meter will timeout. The usage data can be returned to the smart meter monitor 124, which in turn can forward the usage data to the service ticket control 126. The increased ping rate provides for a quicker detection of a corrected fault and a quicker closing of the ticket and recall of the service crew, as described herein. Alternatively, if the Nth smart meter 112 does not respond, the smart meter monitor 124 can provide the service ticket control 126 with a notification of a timeout (no-reply). As noted, the usage data (if received) can include an incoming (input) voltage and a current power usage of the Nth premises.

Continuing with the given example, the service ticket control 126 can analyze the usage data or the timeout and the data record for the Nth premises to determine the course of action to restore service (power). In many cases, the service ticket control 126 can generate a given service ticket with information needed to resolve the reported outage. For instance, if the smart meter 112 is not replying to pings, the service ticket 126 may automatically generate a service ticket with a field service visit to the Nth premises 110. Alternatively, as explained, the customer may request a field service visit to restore service, and in this situation, the service ticket is also generated. The information in the service ticket information can include, for example, an address of the Nth premises, the unique identifier of the Nth smart meter, etc. Additionally, the service ticket control 126 can provide the customer service system 129 with similar information.

In response to receipt of the service ticket, the service crew dispatch 128 can issue a dispatch order that includes the customer service ticket to a service crew, such as the service crew 130. In some examples, the service crew 130 may set out (e.g., drive toward) for the Nth customer premises immediately. In other examples, the service crew 130 may add the service ticket to a ticket queue.

Additionally or alternatively, the customer service system 129 can communicate with the customer at the Nth premises 110 that reported the outage. The communication can be in the same or different form (voice, text, email, etc.) that was used by the customer to initially report the outage. In particular, the customer service system 129 can analyze the usage data for the Nth smart meter 112 (provided from the service ticket control 126) to determine if corrective action can be taken by the customer. In particular, if the usage data indicates that the Nth smart meter 112 of the Nth premises 110 has an incoming voltage from the Kth transformer 108 that is at or above a threshold level, and the current power usage at the Nth premises 110 is about 0 kWh, it is likely that the circuit breaker 113 at the Nth customer premises has been tripped. In such a situation, the customer service system 129 (e.g., by an automated system or by a customer service representative) can provide the customer with instructions correcting a fault behind (e.g., downstream) of the Nth smart meter 112, such as instructions for resetting the circuit breaker 113.

Upon receiving the instructions for resetting the circuit breaker 113, the customer may provide an indication to the customer service system 129 that power has been restored. In response, the customer service system 129 can provide an indication to the service ticket control 126 that the service ticket has been completed. In such a situation, the service ticket control 126 can provide a notification to the service crew dispatch 128, indicating that the service crew 130 should be recalled or prevented from being dispatched to the Nth customer premises 110.

Additionally, it is noted that in some examples, the service ticket control 126 may not generate a service ticket for a field service visit to the Nth premises 110 in response to the notification from the customer service 129. For instance, in a situation where a large number of smart meters 112 are not responding to pings, the utility server 116 may determine that a multi-premises outage has occurred. In this situation, a field service visit upstream of the Nth premises 110 may be needed (e.g., to a transformer 108 and/or a substation 104), but a field service visit to the Nth premises 110 may be unlikely to resolve the power outage. Additionally, in some situations, upon reporting the outage, the customer may be provided with instructions for resetting the circuit breaker 113 (as described) and upon doing so, power may be restored to the Nth premises 110. In this situation, the service ticket control 126 could be notified (e.g., by the customer service 129) that a field service visit is not necessary, thereby preventing the service ticket control 126 from initially opening the service ticket for a field service visit. Accordingly, in the given example, it is presumed that a generated service ticket specifies a field service visit to the Nth premises 112 is appropriate.

Continuing with the given example, in some situations, the customer at the Nth premises 110 may be unable or unwilling to reset the circuit breaker 113. In such a situation, the customer service system 129 can notify the customer that the service crew 130 will be dispatched to the Nth premises 110 to resolve the outage (e.g., reset the circuit breaker 113 at the Nth premises 110). However, in many instances, prior to arrival of the service crew 130 at the Nth premises 110, the circuit breaker 113 may be reset. For example, a family member, an employee or a neighbor of the customer may assist the customer to reset the circuit breaker 113 of the Nth premises.

Continuing with the given example, the smart meter monitor 124 can continue to ping the smart meter 112 of the Nth premises 110 at the outage rate (e.g., every fifteen minutes). Results (e.g., a timeout or usage data) from the ping are forwarded to the service ticket control 126. In the given example, in a situation where the service ticket is still open (active), indicating that the service crew 130 has or will be dispatched to the Nth premises 110 and the usage data indicates from the smart meter 112 indicates that the customer has acceptable incoming voltage, an acceptable voltage history and that the Nth premises 110 is consuming power (current is flowing through the circuit breaker 113), the service ticket control 126 can determine that the outage for the Nth premises 110 has been resolved. In this situation, the service ticket control 126 can close the service ticket and provide an update to the status of the service ticket to the service crew dispatch 128. Conversely, in the event that the service crew 130 arrives at the Nth premises 110 while the usage data indicates that the Nth premises 110 is still consuming power below the predetermined threshold, the service crew 130 can resolve the power outage (e.g., reset the circuit breaker 113 and/or take other corrective action).

In response to the notification that the service ticket is closed, the service crew dispatch 128 can cancel the field service visit to the Nth premises 110. Such cancelation can include a recall of the service crew 130 from dispatch to the Nth premises 110 or a removal of the service ticket from a queue of the service crew 130 to prevent the service crew 130 from being dispatched to the Nth premises 110. In this manner, an unnecessary service call to the Nth premises is avoided.

Additionally, upon closing the service ticket, the service ticket control 126 can send a notification to the smart meter monitor 124 that the ping rate for the Nth smart meter 112 can be reduced. In response, the smart meter monitor 124 can reduce the ping rate for the Nth smart meter 112 from the outage rate (e.g., once per fifteen minutes) to the initial rate (e.g., once per hour).

By employing the electric power distribution system 100, unnecessary field service calls by service crews (including the service crew 130) can be reduced. In particular, as explained with respect to the given example, in many instances, an outage is reported in situations where a circuit breaker 113 has been tripped. In these situations, by resetting the circuit breaker 113, service (power) can be restored to the customer premises 110. Moreover, by employment of the smart meters 112, the utility server 116 can be provided with usage data from a given smart meter 112 that an associated customer premises is consuming power, thereby indicating a high degree of likelihood (e.g., about 95% or more) that a field service call to the customer premises is unnecessary. Furthermore, by closing the service ticket prior to arrival of a service crew (such as the service crew 130), unnecessary expenses, such as those charged for correcting issues behind (downstream) the given smart meter 112 can be avoided.

Figure 3:
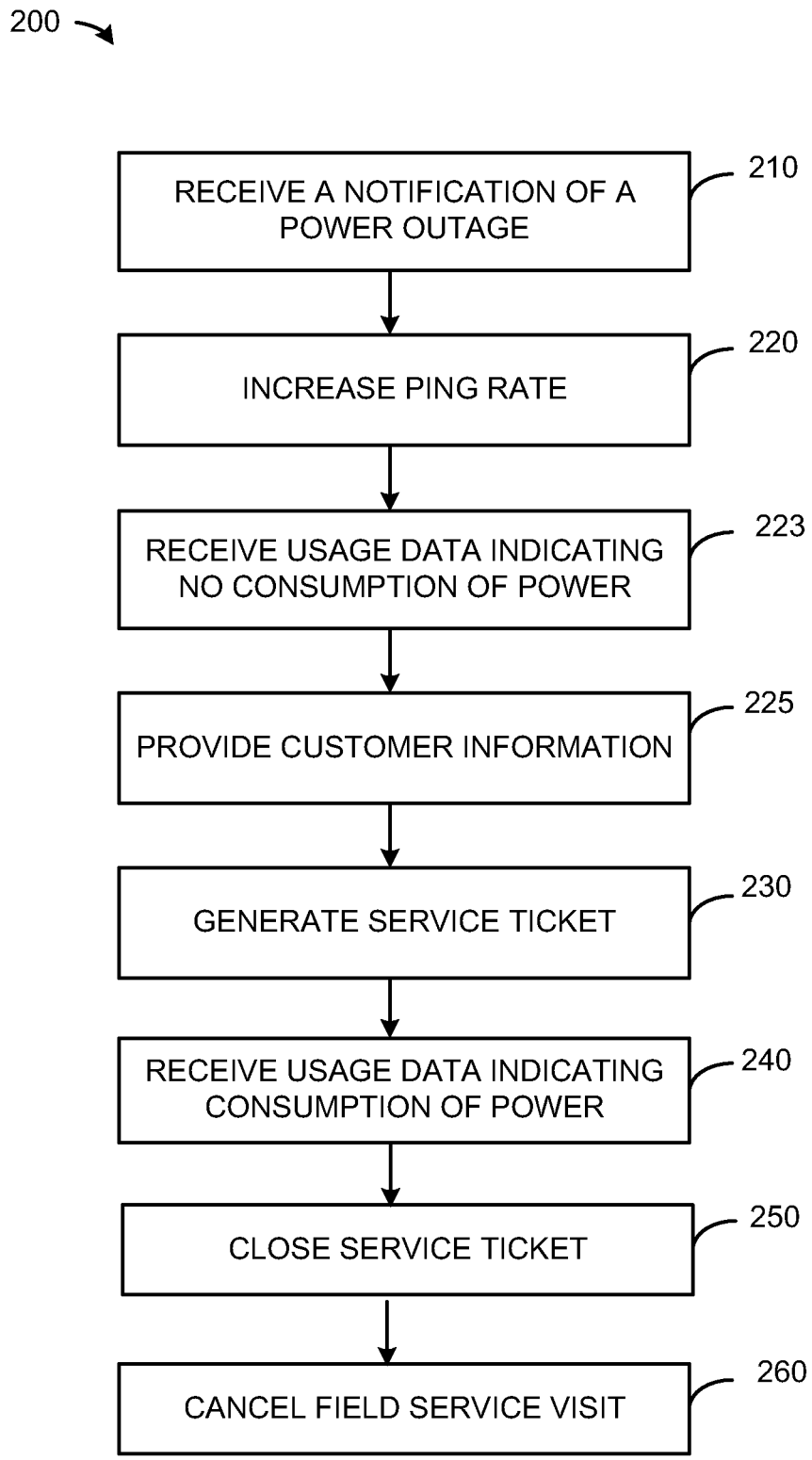
FIG. 3 illustrates a flowchart of an example method for generating and processing service tickets for service crews for an electric power distribution system.

In view of the foregoing structural and functional features described above, an example method will be better appreciated with reference to FIG. 3. While, for purposes of simplicity of explanation, the example method of FIG. 3 is shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement a method.

FIG. 3 illustrates a flowchart of an example method 200 for generating and processing service tickets for a utility provider. The method could be implemented, for example, by a utility server that includes a service ticket control, such as the utility server 62 illustrated in FIG. 1 and/or the utility server 100 of FIG. 2.

At 210, the service ticket control can receive a notification (e.g., from a customer service system) of a power outage experienced at a customer premises. At 220, a ping rate for a smart meter installed at the customer premises can be increased to an outage rate, and the smart meter can be pinged immediately (e.g., within about 5 minutes). At 223, upon pinging the smart meter, usage data may be received from the smart meter that indicates that the smart meter has an incoming voltage that (at least) meets a threshold level and that the customer premises is consuming power below the threshold level (about 0 kWh). At 225, information (e.g., from the customer service system) can be provided to a customer associated with the customer premises for correcting a fault behind (downstream) the smart meter in response to the usage data received at 223. The information could be, for example, instructions for resetting a circuit breaker, replacing a fuse and/or the checking a transfer switch.

At 230, a service ticket can be generated (e.g., by a service ticket control) based on the response (e.g., usage date or a timeout) of the smart meter. The service ticket can request a field service visit to the customer premises to resolve the outage. In such a situation, the usage data (if received) may indicate that the smart meter has an incoming voltage that reaches an acceptable threshold, but that the power consumed by the premises is below an acceptable threshold (e.g., near about 0 kWh), indicating that a circuit breaker downstream from the smart meter is tripped and needs resetting.

At 240, subsequent to the generation of the service ticket, but prior to arrival of the service crew at the customer premises, the utility server can receive usage data (provided in response to a ping) indicating that the customer premises is consuming power at a level above the acceptable threshold level (e.g., above about 0 kWh). At 250, in response to receipt of such usage data, the service ticket control can close the service ticket. At 260, in response to closing the service ticket, the field service visit to the customer premises can be canceled by the utility server. In some examples, canceling of the field service visit can include sending a recall message to the service crew that is on route to the customer premises. In other examples, the canceling of the field service visit can include removing the service ticket from a queue of the field service crew.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A non-transitory machine readable medium having machine executable instructions executed by a computer, the machine executable instructions when executed by the computer, causing the computer to execute a method, the method comprising:
   receiving, by a service ticket control, a notification from a customer service system indicating that a customer at a given customer premises reported a power outage via a public network, and the service ticket control generates an open service ticket to dispatch a service crew assigned to the service ticket for a field service visit to the given premises in response to the notification from the customer service system;
   automatically increasing, by a smart meter monitor, a ping rate from a default rate for a given smart meter over a utility network at the given customer premises in response to the notification from the service ticket control that the customer premises is experiencing the power outage;
   receiving, by the smart meter monitor, usage data from the given smart meter at the given customer premises via the utility network, wherein smart meter monitor automatically reduces the ping rate to the default rate for the given smart meter in response to receiving the usage data indicating that the given customer premises is consuming power above a predetermined threshold level; and closing, by the service ticket control, the open service ticket for the field service visit to the given premises in response to the usage data from the given smart meter indicating that the customer premises is consuming power above the predetermined threshold level, wherein the open service ticket is left open in response to the usage data from the given smart meter indicating that the customer premises is consuming power below the predetermined threshold level or in response to the smart meter monitor receiving a notification of a timeout from the given smart meter;

recalling, by a service crew dispatch, the service crew dispatched for the given customer premises and automatically preventing the service crew from being dispatched to the given customer premises before the service crew arrives at the given customer premises in response to the service ticket control closing the service ticket, wherein the service crew dispatched is not recalled if the open service ticket is left open.

2. The medium of claim 1, wherein the utility network is a mesh network comprising a plurality of smart meters installed at a corresponding plurality of customer premises.

3. The medium of claim 1, wherein the ping rate is increased from a rate of about once per hour to a rate of about once per fifteen minutes.

4. The medium of claim 1, wherein the usage data from the given smart meter provides data characterizing an incoming voltage for the given premises and a current power consumed by the given premises.

5. The medium of claim 1, wherein the usage data from the given smart meter further provides data characterizing an incoming voltage history for the given premises over a predetermined period of time.

6. The medium of claim 1, wherein the service ticket control queries a database for a unique identifier of the given smart meter in response to the notification from the customer service system.

7. The medium of claim 6, wherein the unique identifier is an Internet Protocol version 6 (IPv6) address.

8. The medium of claim 6, wherein the unique identifier is a media access control (MAC) address assigned to the given smart meter.

9. The medium of claim 1, wherein the smart meter monitor pings another smart meter at another customer premises and provides the service ticket control with a notification of a timeout in response to receiving no reply from the other smart meter, wherein the service ticket control opens another service ticket for field service at the other customer premises in response to the notification of the timeout.

10. A computing system comprising:
a memory for storing machine executable instructions executed by the computing system; and
a processing unit comprising one or more processor cores that access the memory and executes the machine readable instructions, the machine readable instructions when executed by the processor, causing the computing system to execute a method, the method comprising:
receiving, by a customer service system via a given network, an indication that a given customer premises of a plurality of customer premises is experiencing a power outage;

opening, by a service ticket control, a service ticket to dispatch a service crew assigned to the service ticket for the power outage in response to a notification of the power outage from the customer service system, wherein the service ticket requests a field service visit to the given customer premises to resolve the power outage;

automatically increasing, by a smart meter monitor, a ping rate from a default rate for a given smart meter over a utility network at the given customer premises in response to the notification from the service ticket control that the customer premises is experiencing the power outage;

dispatching, by a service crew dispatch, a the service crew assigned to the service ticket for a field service visit at the given customer premises in response to the opening of the service ticket;

receiving, by the smart meter monitor, usage data from the given smart meter at the given customer premises via the other network, wherein the smart meter monitor automatically reduces the ping rate to the default rate for the given smart meter in response to receiving the usage data indicating that the given customer premises is consuming power above a predetermined threshold level;

closing, by the service ticket control, the open service ticket for the field service visit to the given premises in response to the usage data from the given smart meter indicating that the customer premises is consuming power above the predetermined threshold level, wherein the open service ticket is left open in response to the usage data from the given smart meter indicating that the customer premises is consuming power below a predetermined threshold level or in response to the smart meter monitor receiving a notification of a timeout from the given smart meter; and recalling, by a service crew dispatch, the service crew dispatched for the given customer premises and automatically preventing the service crew from being dispatched to the given customer premises before the service crew arrives at the given customer premises in response to the service ticket control closing the service ticket, wherein the service crew dispatched is not recalled if the open service ticket is left open.

11. The computing system of claim 10, wherein the method executed by the computing system further comprises cancelling, by the service crew dispatch, the field service visit for the given customer premise in response to the service ticket control closing the service ticket.

12. The computing system of claim 10, wherein the customer service system provides information to a customer at the given customer premise for correcting a fault behind the given smart meter in response to usage data from the given smart meter indicating that the given smart meter has an incoming voltage that meets a predetermined threshold level and that the customer premises is consuming power below the predetermined threshold level.

13. The computing system of claim 12, wherein the method executed by the computing system further comprises resetting a circuit breaker at the given customer premises.

14. The computing system of claim 12, wherein the method executed by the computing system further comprises providing information that includes-instructions for replacing a fuse and/or checking a power transfer switch at the given customer premises.

\* \* \* \* \*